UNITED STATES PATENT OFFICE.

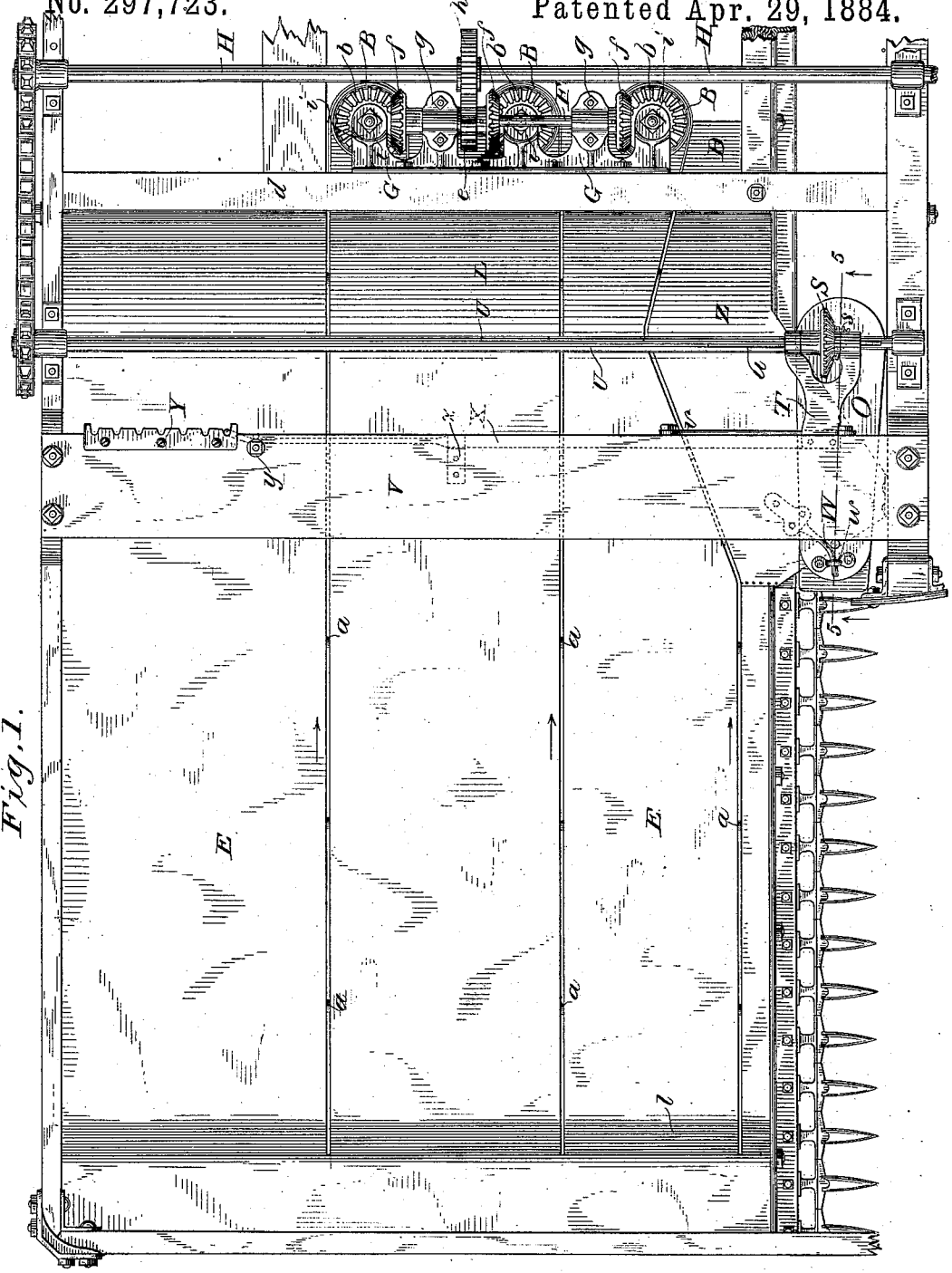

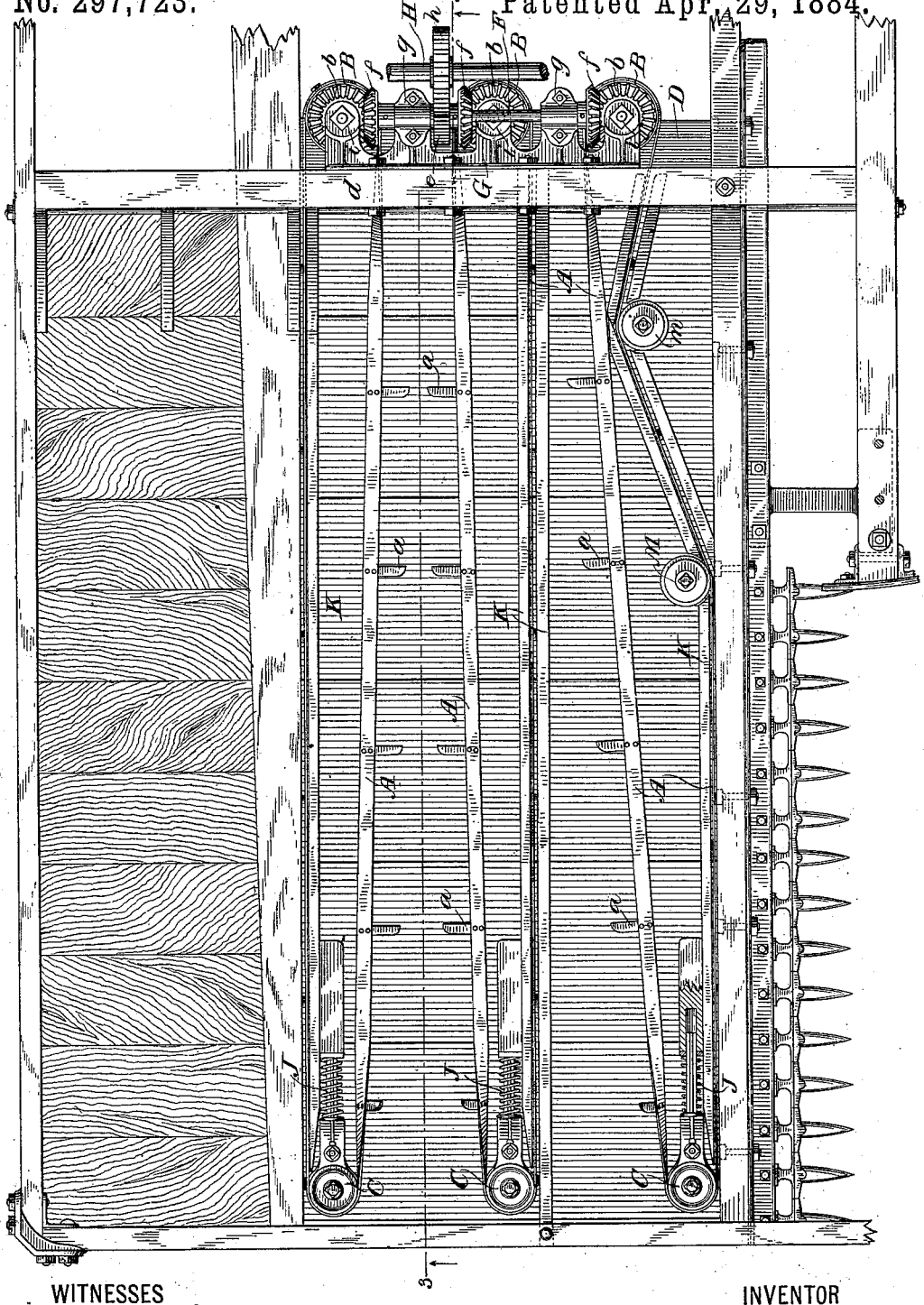

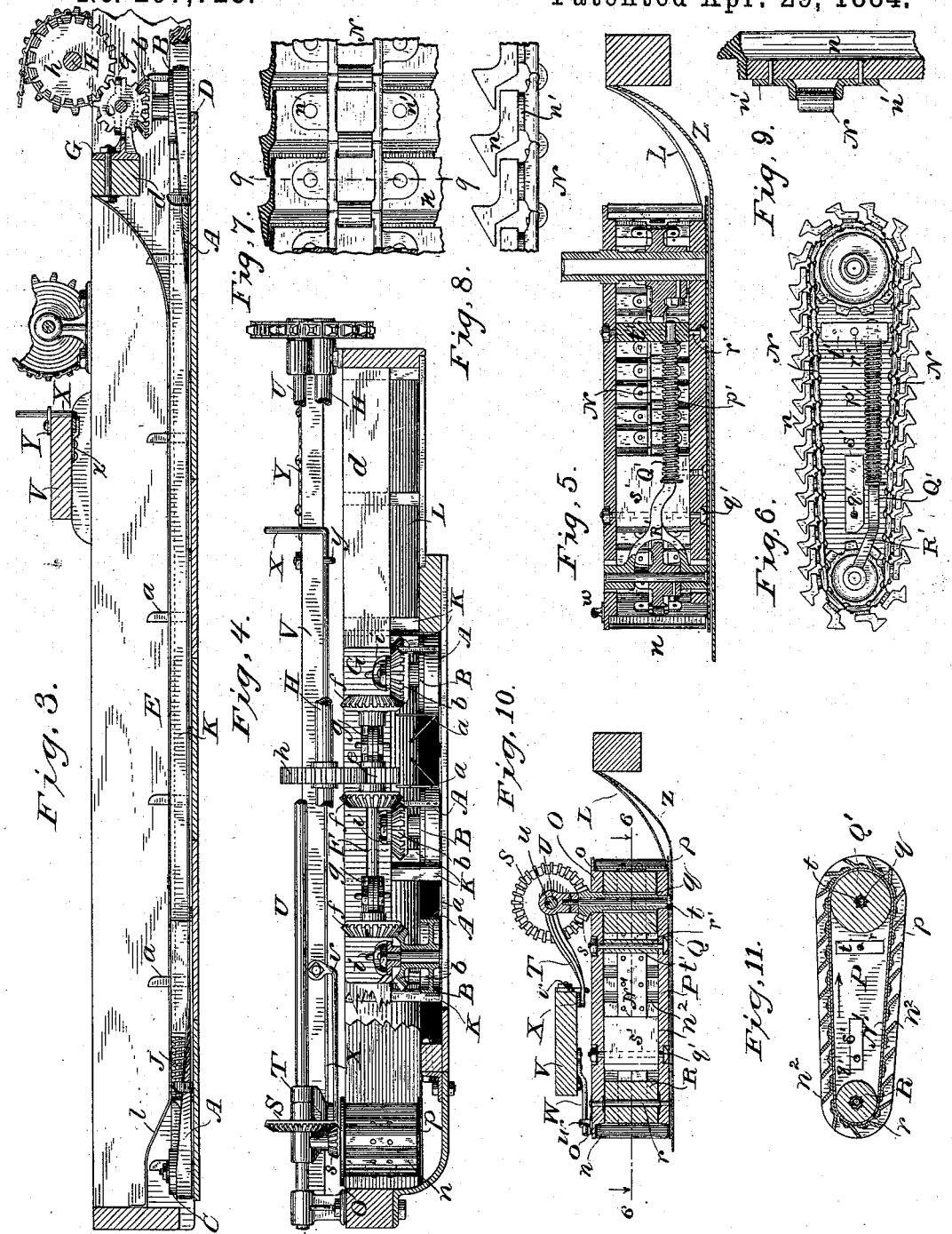

JAMES R. SEVERANCE, OF FREMONT, OHIO.

GRAIN-DELIVERING APPARATUS FOR HARVESTERS.

SPECIFICATION forming part of Letters Patent No. 297,723, dated April 29, 1884.

Application filed October 20, 1883. (No model.)

*To all whom it may concern:*

Be it known that I, JAMES R. SEVERANCE, of Fremont, in the county of Sandusky and State of Ohio, have invented certain new and useful Improvements in Grain-Delivering Apparatus for Harvesters, of which the following is a specification.

My invention relates to improvements in grain-delivering apparatus in which toothed endless-carrier mechanism and co-operating butting or evener mechanism are employed.

My object, mainly, is to provide inexpensive, simply-constructed, and reliably-operating endless-carrier mechanism of the class applicable to grain-platforms of binders, and the actuating-pulleys of which revolve with their faces or upper sides in a plane parallel to the surface of the platform, through slots in which the carrier-teeth project when moving inward or acting on the grain, and beneath which surface and parallel thereto, or nearly so, the teeth extend when out of action on moving outward. One type of this class of carriers is shown in United States Letters Patent No. 283,671, granted to me August 21, 1883.

In accordance with my present invention, instead of employing endless chains and vibrating feeding-teeth pivoted thereto, as in my prior patented invention, I employ endless belts or straps to which the feeding-teeth are riveted or otherwise rigidly attached. Each tooth is fixed at its base or shank to the side of its belt and transversely thereto, so as to project from one edge thereof. The teeth are turned to pass beneath the platform, or caused to assume their inoperative position, by the torsional sag or twist of the belts, and are turned up, preparatory to entering the platform-slots to act on the grain, by the straightening of the belts as they pass around their pulleys at the outer end of the platform.

The subject-matter herein claimed will be particularly pointed out, after describing my invention as applied to the platform of a grain-binder, by the aid of the annexed drawings, in which—

Figure 1 is a plan or top view with parts broken away, showing those features only of suitable mechanism illustration of which is thought to be sufficient to show an appropriate adaptation of my invention. Fig. 2 is a plan view with the platform-surface and other parts removed. Fig. 3 is a view partly in front elevation and partly in vertical section on the line 3 3 of Fig. 2. Fig. 4 is an end elevation, parts being broken away and other parts in section. Fig. 5 is a view partly in front elevation and partly in section on the line 5 5 of Fig. 1, showing details of the butting or grain, evener mechanism. Fig. 6 is a plan view of the butter with its cover-piece removed. Fig. 7 is a view in elevation, looking at the inner side, of a portion of the endless butter; Fig. 8, a top view of the same, and Fig. 9 a section on the line 9 9 of Fig. 7. Fig. 10 is a sectional elevation, corresponding with Fig. 5, of a modification of the butter, and showing, in addition, connecting parts omitted from Fig. 5, but common to both forms of butter. Fig. 11 is a section on the line 6 6 of Fig. 10.

As in this instance organized, my improvements are adapted for use in connection with feeding and packing mechanism shown in United States Letters Patent No. 281,570, granted to me July 17, 1883, such feeding and packing mechanism acting upon the grain as presented to it by the delivering apparatus constituting my present invention, and compacting the grain in gavels for binding, as will readily be understood by reference to said Letters Patent. Each carrier-belt A of the series is operated by a driving-pulley, B, and a driven pulley, C. In this instance there are three of these endless belts. The three driving-pulleys B are suitably mounted at the inner end or prolongation of the platform D. The three driven pulleys are located at or near the outer end of the platform. The cover or surface E of the platform is provided with slots for feeding-teeth *a*, which are rigidly attached to the belts by rivets or otherwise. The endless belts are preferably of "rubber belting"—a well-known composite material, (made of cloth or threads and rubber in layers,) which is practically inelastic, highly flexible, impervious to moisture, strong, and durable. The feeding-teeth are rigidly attached by their shanks or bases to the side of a piece of belting of sufficient length crosswise thereof, and project from one edge of the belting. As shown, two rivets serve to firmly connect a tooth with the belting, so that, as further on to be made apparent, the teeth, following the flexure of their endless belt, are turned into their inoperative position by the twist or torsional sag of the belt, and are restored to their upright or working position by the straightening of the belt when the twist is taken out of it in passing around its pulley C. The belt-driving pulleys B have motion imparted to them in suitable way, as by means of a rotating shaft, F, having fixedly-attached bevel-gears $f$, engaging corresponding gears, $b$, formed with the pulleys. The carrier-actuating shaft F rotates in bearings $g$, supported by two arms of a bracket, G, bolted to a cross-bar, $d$, of the platform-framing. A driving-shaft, H, continuously driven while the machine is in action by appropriate mechanism, drives the carrier-actuating shaft by means of gears $h$ and $e$, respectively, fastened to the driving-shaft and the carrier-actuating shaft. Each driving-pulley B, with its attached gear, is supported so as to revolve about a vertical axis, or with the face or upper side of the pulley parallel to the platform's surface. As shown, upright hanger-shafts support the driving-pulleys, each of these shafts being supported in a bearing-arm, $i$, of the bracket G. The faces or upper sides of the driven pulleys C are parallel to the platform's surface, and these pulleys are adjustably mounted and acted upon in suitable way by springs J, so as to keep the toothed belts under proper tension.

Various parts of the mechanism above described more or less closely resemble features shown in my before-mentioned improvements, patented as No. 283,671, the carrier-belts of my present invention, like the chains of said patented improvements, passing around the pulleys beneath the platform's surface and moving in both directions in the same plane, or thereabout, and parallel, or nearly so, to the platform's surface. Suitable guideways, K, on the platform boarding or bottom, formed, as will readily be understood by inspection of Fig. 2, assist in maintaining the working sides or inwardly-moving taut portions of the belts in proper position, and insure the projection of the feeding-teeth vertically through the platform-slots while preventing unnecessary friction between the teeth and the sides of the slots. The platform surface or cover curves upwardly at its inner end, L, thus enabling the feeding-teeth to withdraw or clear themselves from the grain near the driving-pulleys, and after having delivered it at or near the inner end of the platform, where it is within reach of suitable mechanism for carrying it away to the place of bundling and binding. Near the outer end of the platform its surface or cover is inclined or curved upwardly, as at $l$. In this way a space is provided, as shown, beneath the cover and above and inside of the driven pulleys, so that the feeding-teeth may be elevated in passing about the driven pulleys and then enter the slots in the cover.

From the above description it will be seen that as those portions of the belts which are passing around the pulleys hug them closely, the teeth, while passing about the pulleys, are necessarily held up, and in this way are brought by the driven pulleys into position to enter the outer ends of the slots at the incline $l$ of the platform's surface, no cam or tooth-elevating device of any kind being required in connection with the driven pulleys. It will further be seen that the teeth, after passing about the driving-pulleys, are caused, by the torsional sag or twist of the slack side or outwardly-moving portion of the belt, to assume their inoperative or horizontally-extending position, the gradual downward movement of the teeth by the torsional flexure of the belts being assisted, if necessary, by the contact of the teeth with the under side of the curve or incline L. In nearing the driven pulleys the slack sides of the belts gradually straighten out, and the teeth are permitted to rise correspondingly with the edge of the belt from which they project by the space afforded beneath the incline $l$ of the platform's surface.

In order that adjustable mechanism—such as soon to be described—for butting or evening the grain may be advantageously employed in connection with the endless carrier, the working side or inwardly-moving front portion of the foremost section or belt of the carrier is deflected inwardly or inclined toward the back of the platform, near the inner end thereof, thus leaving an unobstructed space near the inner front corner of the platform's surface, in advance of the inner portion of the front slot thereof. A pulley, M, in front of which the foremost carrier section or belt passes, and a pulley, $m$, in rear of which the belt passes, serve to suitably deflect it. These pulleys are properly mounted, so as to turn freely by stud-shafts supported on the platform-bottom. The grain is evened at its butts and pressed backward to the desired extent (more or less) according to the length, and for a well-known purpose by an adjustable rotating endless butter, consisting of an endless chain, N, having ribs or teeth $n$ secured vertically thereto. The teeth extend crosswise of the chain, are rigidly attached to it, and are inclined, so that on the inwardly moving or working side of the chain they project toward the outer end of the platform as well as toward the back thereof. In this way the teeth are caused to act gradually on the grain, as will presently be understood, and entanglement of the grain with the teeth is prevented. The teeth are secured to the chain by rivets passing through their attaching flanges or bases and through side lugs, $n'$ $n'$, of the links of the chain. The butter is mounted in a frame which incloses it at top and bottom, and by which it is rendered horizontally adjustable, the frame being movable toward and away from the carrier, over and close to the surface of the platform at the unobstructed space provided near its inner front corner. The butter-frame is shown as formed of a top or cover piece, O, and a bottom piece, P, both of wood, and a metallic base-plate, p. This plate is secured to and beneath the bottom piece, and projects slightly beyond it all around, so that the chain will be supported against downward movement by the contact of the lower ends of the teeth with the base-plate. The top piece, O, is rabbeted all round to form a ledge or shoulder, o, overlapping the butter-teeth, and preventing the chain from working upward. The driving-pulley Q and driven pulley R of the butter are fast to their shafts $q$ and $r$, which rotate in suitable bearings in the top and bottom of the butter-frame. The shaft $q$ of the driving-pulley of the butter is tubular, and has a bevel-pinion, $s$, at its upper end above the top of the butter-frame. This pinion is rigid with the shaft, being either keyed thereto or formed in one piece therewith, as shown in Fig. 10. A rod, $t$, headed at its lower end, passes upward through the driving-pulley shaft and the bevel-pinion, and serves, in connection with a bracket, T, to suspend one end of the butter-frame from a rotating shaft, U, which carries a bevel-gear, S, meshing with the pinion $s$, to actuate the butter. The suspending-rod is shown as secured to the bracket by having its reduced threaded end screwed into a tap in the bracket, and by a cross-pin passing through the rod end and the bracket. The bolts $q'$ and $r'$, headed at their lower ends and provided with nuts at their upper ends, serve, in connection with spacing-blocks $s'$ $t'$, to unite the top and bottom parts of the butter-frame and hold them at the proper distances apart. The butter is held under tension by means of spring-actuated sliding bearings for its driven-pulley shaft. As shown, these bearings are formed with a yoke, R', at one end of a slide-rod, Q', which is mounted at its opposite end in the spacing-block $t'$, and acted upon by a spring, $p'$. (See Figs. 5 and 6.) The bevel-gear S is caused to rotate with the shaft U, while free to be slid along it, by means of a feather on the gear engaging a groove, $u$, in the shaft. The frame-suspending bracket T is also allowed sliding movement along the shaft U. It is supported upon the shaft by being forked and having its forks perforated to fit about the shaft at the sides of the hub of the bevel-gear. This bracket is further supported by means of a rod, $v$, secured at its upwardly-bent ends to a cross-piece, V, of the platform-framing. The bracket at its end opposite that supported by the shaft U rests upon and may be slid along the supporting-rod $v$ in the guideway formed between it and the bottom of the cross-piece. At its outer end the butter-frame is supported by being suspended from the frame cross-piece V in such manner that this frame as moved back and forth along the shaft U at its inner end vibrates about its outer support, and at the same time moves slightly longitudinally. This outer support for the butter-frame is formed by a curved and rounded arm, W, secured to the under side of the cross-piece V. A loop or eye, $w$, on the butter-frame connects it with this supporting-arm.

Suitable mechanism for adjusting the butter and securing it in its adjusted position is provided. As shown, this mechanism consists of a slide-rod, X, fastened to the bracket T at its outer end, cranked or bent upwardly at its inner end to engage a detent-rack, Y, and flattened from its outer end inwardly for the greater portion of its length. This sliding adjusting-rod is supported against the under side of the cross-piece V by means of a bracket-lug, $x$, and an eyebolt, $y$. The rounded portion of the rod close to its cranked inner end passes through the eye of the bolt $y$. The rod is bent horizontally slightly between the eyebolt and its crank, so that the crank will clear the edge of the cross-piece. The portion Z of the platform-cover, at its inner front corner in advance of the front slot for the feeding-teeth, is slightly lower than adjacent parts of the rest of the cover, in order that the butter-frame may be supported at the level best adapted to the proper working of the butter.

As shown in Figs 10 and 11, the endless butter is slightly modified in the following respects: A belt, N', is substituted for the chain N. The inclined teeth $n^2$ differ in shape from those $n$, which I prefer to employ. Smooth wooden pulleys are substituted for the sprocket-pulleys, and their shafts are longitudinally ribbed or fluted and fastened in place by being forcibly driven through central openings of the pulleys. The pinion $s$ is formed with the tubular shaft of the driving-pulley, instead of being made separately, and keyed in place, and the devices for stretching the endless butter or keeping it under proper tension are omitted. I prefer to employ the endless butter, in which a chain composed of suitable separably-connected links is used, (shown by Figs. 5 to 9, inclusive,) as there are important practical advantages attendant upon such construction.

The butter-actuating shaft corresponds with the packer-actuating shaft of my before-mentioned Patent No. 281,570, and may be driven in any suitable way, as by means of a chain and pulleys connecting it with the driving-shaft H.

The operation of the butter will be readily understood from the above description. In adjusting it by the slide-rod, which is rigidly attached to it, the crank of this rod is disengaged from the detent-rack by pushing it sidewise, the torsional spring of the rod allowing of this movement. The butter is then pushed or pulled into the desired position, by the rod, and the crank released and allowed to spring into one of the notches of the detent. As it is obvious that essential features of my invention may be applied to machines other than grain-binders—for instance, to harvesters generally, or so as to constitute straw-carrying mechanism of grain-separators—I do not wish to be understood as confining my invention herein claimed to any special application, nor to details of construction and arrangement as particularly described and illustrated.

I claim as of my own invention—

1. The combination of the endless belt, and the feeding-teeth rigidly secured to the side and crosswise of the belt and projecting from its edge, substantially as and for the purpose hereinbefore set forth.

2. The combination, substantially as hereinbefore set forth, of the slotted surface or platform-cover, driving and driven pulleys rotating with their faces in a plane parallel to the slotted surface, endless belts beneath the slotted surface and passing around said pulleys, and the feeding-teeth rigidly secured to the sides and crosswise of the belts and projecting from their edges, for the purpose described.

3. The combination of the platform having the slotted surface, the endless carrier, and the pulleys by which the front section of the carrier is deflected inwardly at the inner front corner of the slotted surface, substantially as and for the purpose hereinbefore set forth.

4. The combination of the platform having the slotted surface lowered at its inner front corner, the endless carrier, and means by which the front section of the carrier is deflected inwardly to leave an unobstructed space above the lowered inner front corner of the platform's surface, substantially as and for the purpose hereinbefore set forth.

5. The combination, substantially as hereinbefore set forth, of the platform having the slotted surface, the endless carrier, means by which the front section of the carrier is deflected inwardly to provide an unobstructed space at the inner front corner of the platform's surface, and the adjustable butter, for the purpose described.

6. The combination, substantially as hereinbefore set forth, of the platform, the butter, its frame, the butter-actuating shaft, the suspending-bracket sliding along said shaft, and with which the butter-frame is connected at its inner end, and the support for the outer end of the butter-frame and by which it is allowed vibratory and longitudinal movement, for the purpose described.

7. The endless butter composed of the chain having the inclined teeth secured to its detachably-united links, substantially as and for the purpose hereinbefore set forth.

In testimony whereof I have hereunto subscribed my name this 24th day of September, A. D. 1883.

JAMES R. SEVERANCE.

Witnesses:
   H. S. BUCKLAND,
   GEORGE BUCKLAND.